United States Patent
Rozenberg et al.

(10) Patent No.: US 11,947,028 B2
(45) Date of Patent: Apr. 2, 2024

(54) POSITIONING USING SATCOM

(71) Applicant: ISRAEL AEROSPACE INDUSTRIES LTD., Lod (IL)

(72) Inventors: Ohad Rozenberg, Yad Binyamin (IL); Menachem Saidov, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 17/919,889

(22) PCT Filed: May 18, 2021

(86) PCT No.: PCT/IL2021/050566
§ 371 (c)(1),
(2) Date: Oct. 19, 2022

(87) PCT Pub. No.: WO2021/240504
PCT Pub. Date: Dec. 2, 2021

(65) Prior Publication Data
US 2023/0184876 A1   Jun. 15, 2023

(30) Foreign Application Priority Data

May 27, 2020 (IL) .......................................... 274997

(51) Int. Cl.
*G01S 5/02* (2010.01)
*G01S 13/46* (2006.01)

(52) U.S. Cl.
CPC .......... *G01S 5/02585* (2020.05); *G01S 13/46* (2013.01); *G01S 2013/468* (2013.01)

(58) Field of Classification Search
CPC ..... G01S 13/46; G01S 5/02585; H01Q 21/06; H01Q 1/28; H01Q 3/24; H01Q 3/02;
(Continued)

(56) References Cited

U.S. PATENT DOCUMENTS

| 5,208,757 A | 5/1993 | Appriou et al. |
| 6,124,832 A * | 9/2000 | Jeon ...................... H01Q 25/00 343/766 |

(Continued)

FOREIGN PATENT DOCUMENTS

| EP | 0148704 A2 | 7/1985 |
| JP | 2015195505 A | 11/2015 |

OTHER PUBLICATIONS

Conte, Gianpaolo, et al., "An Integrated UAV Navigation System Based on Aerial Image Matching", Department of Computer and Information Science, Artificial Intelligence and Integrated Computer System Division, Linkoeping University, Linkoeping, Sweden, Updated Oct. 23, 2007, 28 pp.

(Continued)

Primary Examiner — Congvan Tran
(74) *Attorney, Agent, or Firm* — Dorsey & Whitney LLP

(57) ABSTRACT

According to one aspect of the presently disclosed subject there is provided a system implemented in a mobile carrier for determining a position of the mobile carrier by using a processing and memory circuitry (PMC) and a satellite communications on the move (SOTM) antenna system, being configured to maintain a communications link from a satellite communications (SATCOM) having a spatial position. The system is configured to obtain data indicative of the spatial position of the SATCOM, the estimated altitude of the mobile carrier and the direction of the antenna towards the SATCOM spatial position and to determine the position of the mobile carrier.

18 Claims, 4 Drawing Sheets

(58) Field of Classification Search
CPC . H01Q 21/28; H01Q 1/42; H01Q 3/08; H04B 7/18504; H04B 7/18508; H04B 7/1851; H04B 7/18517; H04B 7/18513
See application file for complete search history.

(56) References Cited

U.S. PATENT DOCUMENTS

| | | | |
|---|---|---|---|
| 7,191,056 | B2 | 3/2007 | Costello et al. |
| 10,262,546 | B2 | 4/2019 | Cabello |
| 2007/0046448 | A1* | 3/2007 | Smitherman .......... G01C 11/02 348/143 |
| 2008/0215204 | A1* | 9/2008 | Roy ..................... G05D 1/0044 701/28 |
| 2009/0160701 | A1* | 6/2009 | Son ..................... H01Q 1/3275 342/352 |
| 2010/0315288 | A1* | 12/2010 | Liu ........................ H04B 7/086 342/359 |
| 2017/0248701 | A1 | 8/2017 | Adler et al. |
| 2017/0325111 | A1 | 11/2017 | Reese et al. |
| 2018/0156616 | A1* | 6/2018 | Bennett ................ B64C 39/024 |
| 2018/0208326 | A1* | 7/2018 | Sander .................... H04K 3/84 |
| 2018/0319511 | A1 | 11/2018 | Tidhar |
| 2019/0013566 | A1* | 1/2019 | Merrell ................ H01Q 1/1257 |
| 2019/0310341 | A1 | 10/2019 | Wang et al. |
| 2020/0125526 | A1* | 4/2020 | Wiseman ............... G07C 5/008 |
| 2020/0226933 | A1* | 7/2020 | Pennisi .................. G01S 19/00 |
| 2020/0242950 | A1* | 7/2020 | Guo ....................... G01S 19/42 |
| 2020/0259250 | A1* | 8/2020 | Diamond ............... H01Q 21/06 |
| 2020/0259556 | A1* | 8/2020 | Chari ................ H04B 7/18526 |
| 2021/0208860 | A1* | 7/2021 | Freeman ................ G06F 21/64 |
| 2022/0086713 | A1* | 3/2022 | Määttänen ...... H04W 36/00837 |

OTHER PUBLICATIONS

Zhao, Jianwei, et al., "Beam Tracking for UAV Mounted SatCom on-the-Move with Massive Antenna Array", Sep. 23, 2017, 12 pp.
International Search Report and Written Opinion dated Aug. 12, 2021 received in PCT/IL2021/050566.
"Dead Reckoning", The Wayback Machine—https://en.wikipedia.org/wiki/Dead_reckoning, May 2020, 8 pages.
Hancioglu, et al., "Kinematics and Tracking Control of a Four Axis Antenna for Satcom on the Move", The 2018 International Power Electronics Conference, 2018, pp. 1680-1686.

* cited by examiner

Operational Scenario 100

UAV 110

Position system 200

SOTM antenna system 120 antenna 220

PMC 210

GPS 130 ground station 150

SATCOM 140

*Fig 2*

POSITIONING USING SATCOM

TECHNICAL FIELD

The presently disclosed subject matter relates to a positioning method and system, and more particularly, to a computerized positioning of an unmanned aerial vehicle (UAV) and a system thereof.

BACKGROUND

Mobile carriers such as aircraft including unmanned aerial vehicle (UAV), land vehicles and maritime vessels, are equipped with GPS systems which enable them to communicate with a GPS satellite to determine the current position of the mobile carriers, and assist them to navigate. While receipt of a GPS single is not always stable, and it is sometimes lost for a certain duration, or is spoofed or jammed and cannot be used temporarily or permanently, there is a constant, and sometimes crucial, need to have data on the current position of the mobile carrier. Therefore, it is desired to obtain data on the current position of a mobile carrier even when the GPS signal is not available.

Current known systems enable to determine the position of the UAV even where GPS signal is not available, or cannot be used to determine the current position of the UAV. For example, Conte, G., Doherty, P. *An Integrated UAV Navigation System Based on Aerial Image Matching*, in 2008: IEEE Aerospace Conference, pp. 1-10 IEEE, March 2008, https://www.ida.liu.se/divisions/aiics/publications/AEROCONF-2008-integrated-UAV-Navigation.pdf describes usage of geo-referenced satellite or aerial images to augment the UAV navigation system in case of GPS failure. U.S. Pat. No. 7,191,056 also describes processing of two-dimensional (2-D) sensor images for navigation and determination of position in three-dimensions (3-D) for flying vehicles. For example, landmark features, such as roads, rivers, coastlines, and buildings, are extracted from two-dimensional sensor images and correlated to landmark features data stored in a database via pattern recognition techniques to thereby estimate latitude, longitude, and altitude of the vehicle. U.S. Pat. No. 5,208,757 describes an airborne system for determining the position of an aerial vehicle. A first memory is provided containing the general characteristics of different types of discrete landmarks and a second memory containing the geographic position of such landmarks on the ground to be flown over, a device for extracting, from the signals delivered by sensitive means, the general characteristics of said different types of discrete landmarks located on the ground being flown over, and a device for computing from the signals delivered by said sensitive means the relative positions of said vehicle with respect to said recognized landmarks, which it feeds to Kalman filter means.

However, in order to determine the position of the UAV, the known systems either rely upon known discrete landmarks along the route of the UAV, require the landmarks to comprise devices with sensitive means that emit signals, or uses image processing technology. It is desired to obtain data on the current position of a mobile carrier even when the GPS signal is not available, in a manner that does not rely upon image processing or identification of landmarks.

Alongside the GPS technology, mobile carriers and UAV use communications satellite (SATCOM). SATCOM is used for establishing a communication channel between ground stations, or between a mobile station and a ground station. Stations are equipped with a satellite antenna that is able to establish communication with the SATCOM, but setting the antenna to aim at the SATCOM. Usually, the SATCOM's spatial position is known in advance, either since it is stationary, or since the spatial position can easily be obtained or calculated by the station, e.g. the UAV, using the SATCOM. Ground stations that use SATCOM technology can set their antenna to permanently aim at the spatial position of the SATCOM to maintain a constant link between the ground station and the SATCOM. Since the ground station position is permanent and the SATCOM's spatial position is either permanent or known at any stage, the antenna of the ground station can be locked and track, if required, the SATCOM, to maintain the constant link.

SATCOM On The Move (SOTM), is used in the context of mobile satellite technology. In SOTM, the UAV must track the SATCOM during its movement to maintain a current optimal receipt of signal emitted from the SATCOM in real time. In order to perform the tracking, the UAV is equipped with a satellite antenna system which can capture, and accurately pointing the target SATCOM by repeatedly moving and setting the angle of the antenna towards the SATCOM's spatial position. Since the UAV is on the move, the antenna's angle repeatedly changes in the tracking process.

In some known systems, the tracking process includes a processor fitted on-board the UAV that operably coupled to the antenna. The processor calculates the strength of the signal (e.g. every given time interval) as received by the antenna, while the antenna is moving, compares it to previous strength of the signal received by the antenna, perhaps in different angle of the antenna, and sets the antenna to be in the angle in which the strength of the signal is currently the optimal. In the next time interval, the UAV's position towards the SATCOM may be different. Hence, a different angle of antenna, in which the signal's receipt is optimal, may be determined and set. Other known systems, may use different processes for tracking the SATCOM's spatial position and determining the angle of the antenna in which the signal's receipt is optimal. The SATCOM technology operates simultaneously and independent of the GPS technology.

GENERAL DESCRIPTION

The presently disclosed subject matter deals with mobile carriers including unmanned aerial vehicle (UAV), land vehicles and maritime vessels. As explained above, UAV are equipped with GPS systems enabling to receive GPS signal and determine the position of the UAV at any moment based on the GPS signal. As explained above obtaining constant data of the position of the UAV may be crucial even when GPS signals are not available.

In addition, mobile carriers, including the UAV, utilizes SATCOM and SOTM technologies, as described above. The SATCOM technology operates simultaneously and independent of the GPS technology.

Bearing this in mind, in some cases of the invention, since the SATCOM spatial position is known to the UAV, and the current altitude of the UAV is also known to the UAV (using known per se techniques), the UAV is configured to determine its current position, using the spatial position of the SATCOM, the current altitude of the UAV and the current angle of the antenna towards the SATCOM's spatial position, thereby determining the UAV's position, without the GPS signal.

Calculating the current position of the UAV without using GPS system is advantageous, for example, in cases where a GPS signal is disrupted. Moreover, determining the position in accordance with embodiments of the invention, using SATCOM in the manner described herein does not involve complex computations or, does not rely upon ground landmarks or require image processing technology, and implements, a quick way of calculating and determining the position of the UAV when needed. In vehicles on the move, fast calculation is advantageous and can be crucial for certain type of applications.

It is to be noted that the subject matter described below utilizes known techniques for determining the angle of the antenna in which the signal receipt from the SATCOM, is optimal. These known techniques for determining the angle of the antenna are provided for simplicity of explanation. Accordingly, the invention, as will be described herein, is not bound by any specific technique.

Also, it is to be noted that the subject matter describe below is described with respect to a specific example of a UAV and a SATCOM, and determining the position of the UAV, partially based on data indicative of the spatial position of the SATCOM. However, SATCOM should not be considered as limiting, and any radiation emitting object can be used to implement the invention, if a signal from that object can be received at the UAV, and if the position of the radiation emitting object is known to or can be calculated by the UAV. One example of such radiation emitting object is a ground station, where the UAV communicates with the ground station using a Line Of Sight directional antenna. One alternative implementation is illustrated in FIG. 4 with respect to ground station 150.

According to one aspect of the presently disclosed subject matter there is provided, in a mobile carrier, the mobile carrier comprising a processing and memory circuitry (PMC) and a satellite communications on the move (SOTM) antenna system that includes an antenna and being configured to maintain a communications link from a satellite communications (SATCOM) having a spatial position, a method for determining a position of the mobile carrier, the method comprising, by the PMC:

(a) obtaining data indicative of the spatial position of the SATCOM;
(b) obtaining data indicative of an estimated altitude of the mobile carrier;
(c) obtaining data indicative of an angle of the antenna, wherein the angle is representative of a direction of the antenna towards the SATCOM spatial position; and
(d) determining the position of the mobile carrier, based on the obtained data indicative of the spatial position of the SATCOM, the obtained data indicative of the estimated altitude, and the obtained data indicative of the angle.

In addition to the above features, the method according to this aspect of the presently disclosed subject matter can optionally comprise one or more of features (i) to (vii) below, in any technically possible combination or permutation:

i. wherein the mobile carrier is an unmanned aerial vehicle (UAV).
ii. wherein obtaining data indicative of the angle of the antenna includes obtaining the azimuth and elevation of the angle, relative to the horizontal plane of the earth.
iii. wherein the angle is determined based on a current optimal receipt of a signal emitted from the SATCOM.
iv. the method further comprising repeatedly performing steps (a) to (d).
v. the method further comprising repeatedly performing steps (b) to (d).
vi. wherein the data indicative of the estimated altitude is obtained using at least one of the following: barometric pressure sensors and radar altimeter, fitted on-board the mobile carrier.
vii. wherein the mobile carrier further comprises a GPS receiver configured for receiving a GPS signal from a GPS satellite, and wherein stage (d) is executed in cases where a GPS signal is disrupted.

According to another aspect of the presently disclosed subject matter there is provided a system implemented in a mobile carrier for determining a position of the mobile carrier, the system comprising:

a processing and memory circuitry (PMC);
a satellite communications on the move (SOTM) antenna system that includes an antenna and being configured to maintain a communications link from a satellite communications (SATCOM) having a spatial position;
the PMC is configured to:
(a) obtain data indicative of the spatial position of the SATCOM;
(b) obtain data indicative of an estimated altitude of the mobile carrier;
(c) obtain data indicative of an angle of the antenna, wherein the angle is representative of a direction of the antenna towards the SATCOM spatial position; and
(d) determine the position of the mobile carrier, based on the obtained data indicative of the spatial position of the SATCOM, the obtained data indicative of the estimated altitude, and the obtained data indicative of the angle.

In addition to the above features, the system according to this aspect of the presently disclosed subject matter can optionally comprise one or more of features (viii) to (ix) below, in any technically possible combination or permutation:

viii. a mobile carrier comprising the system.
ix. a mobile carrier comprising the system, wherein the mobile carrier further comprises a GPS receiver configured for receiving a GPS signal from a GPS satellite, and wherein stage (d) is executed in cases where a GPS signal is disrupted.

According to another aspect of the presently disclosed subject matter there is provided in a mobile carrier, the mobile carrier comprising a processing and memory circuitry (PMC) and a satellite communications on the move (SOTM) antenna system that includes an antenna and being configured to maintain a communications link from a satellite communications (SATCOM) having a spatial position, a non-transitory computer readable storage medium tangibly embodying a program of instructions that, when executed by a computer, cause the computer to perform a method for determining a position of the mobile carrier, the method comprising:

(a) obtaining data indicative of the spatial position of the SATCOM;
(b) obtaining data indicative of an estimated altitude of the mobile carrier;
(c) obtaining data indicative of an angle of the antenna, wherein the angle is representative of a direction of the antenna towards the SATCOM spatial position; and
(d) determining the position of the mobile carrier, based on the obtained data indicative of the spatial position of the SATCOM, the obtained data indicative of the estimated altitude, and the obtained data indicative of the angle.

According to another aspect of the presently disclosed subject matter there is provided in an unmanned aerial vehicle (UAV), the UAV comprising a processing and memory circuitry (PMC) and an antenna system that includes an antenna and being configured to maintain a communications link from a radiation emitting object having a spatial position, a method for determining a position of the UAV, the method comprising, by the PMC:
- (a) obtaining data indicative of the spatial position of the radiation emitting object;
- (b) obtaining data indicative of an estimated altitude of the UAV;
- (c) obtaining data indicative of an angle of the antenna, wherein the angle is representative of a direction of the antenna towards the radiation emitting object's spatial position; and
- (d) determining the position of the UAV, based on the obtained data indicative of the spatial position of the radiation emitting object, the obtained data indicative of the estimated altitude, and the obtained data indicative of the angle.

In addition to the above features, the method according to this aspect of the presently disclosed subject matter can optionally comprise the feature below:
- x. wherein the radiation emitting object is stationary or mobile.

The system, method and the non-transitory computer readable storage media disclosed herein according to various aspects, can optionally further comprise one or more of features (i) to (vii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2 illustrates a high-level functional block diagram of a position system fitted on a UAV, in accordance with certain embodiments of the presently disclosed subject matter;

DETAILED DESCRIPTION

As apparent from the following discussions, and unless specifically stated otherwise, it is appreciated that throughout the specification discussions utilizing terms such as "obtaining", "determining", "calculating", "estimating", "performing", "providing", "executing", "receiving" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processing and memory circuitry (PMC) disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

The terms "non-transitory memory" and "non-transitory storage medium" used herein should be expansively construed to cover any volatile or non-volatile computer memory suitable to the presently disclosed subject matter.

Figure 1:
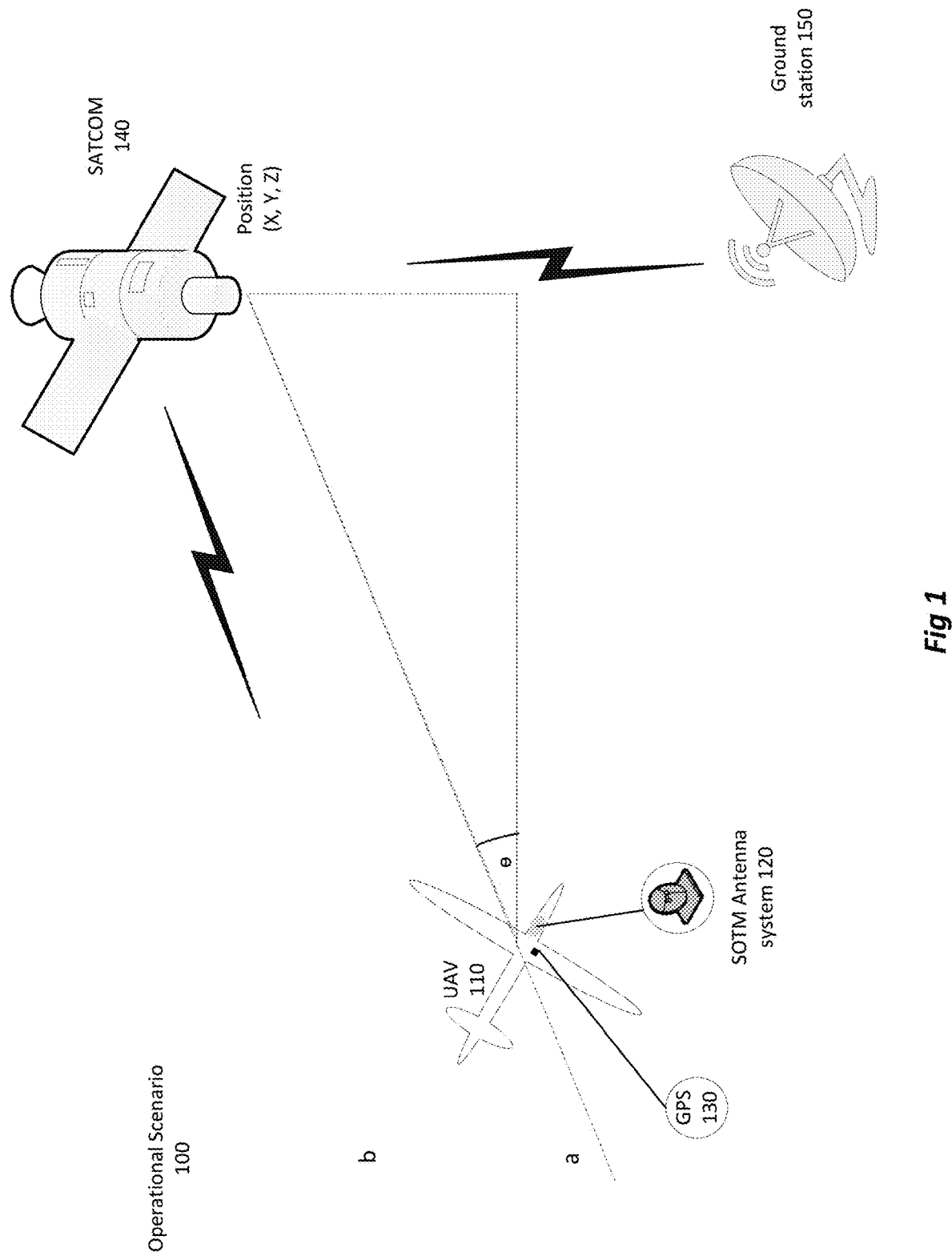
FIG. 1 shows a high-level illustration of an operational scenario in which the position system is utilized in accordance with certain embodiments of the presently disclosed subject matter.

Bearing this in mind, attention is drawn to FIG. 1 which shows a high-level illustration of an operational scenario in which the position system is utilized in accordance with certain embodiments of the presently disclosed subject matter.

FIG. 1 illustrates a operational scenario 100 comprising a mobile carrier, e.g. a UAV 110, a SATCOM 140 having a spatial position, denoted in FIG. 1 as (X, Y, Z) coordinates, and a ground station 150, communicating with the SATCOM 140. The UAV 110 may accommodate a satellite communications on the move (SOTM) antenna system 120 that includes an antenna. The antenna included in the SOTM antenna system 120 being configured to maintain a communications link from the SATCOM 140. The UAV 110 may include a GPS system 130 configured for receiving a GPS signal from a GPS satellite (not shown). According to some examples, the UAV 110 is configured to obtain data indicative of the spatial position of the SATCOM 140, data indicative of an estimated altitude of the UAV 110 and data indicative of an angle of the antenna, represented in FIG. 1 as ⊖. ⊖ represents the direction of the antenna towards the SATCOM spatial position. Based on the obtained data, UAV 110 is configured to determine the position of the UAV 110, all as will be explained in greater details below with reference to FIG. 3.

Attention is now drawn to FIG. 2 illustrating a non-limiting block diagram of a position system 200 fitted on the UAV 110, in accordance with certain embodiments of the presently disclosed subject matter. The numeral references of elements of operational scenario 100, as appearing in FIG. 1, are also applicable to FIG. 2.

As also illustrated in FIG. 1, operational scenario 100 includes UAV 110, SATCOM 140 and ground station 150. UAV 110 comprises a positioning system 200 and a GPS 130. Positioning system 200 may include SOTM antenna system 120 that comprises an antenna 220. Positioning system 200 may further comprise processing and memory circuitry (PMC) 210.

In some examples, the PMC 210 is configured to obtain data indicative of the spatial position of the SATCOM 140. For example, the spatial position is stored in a memory comprised in PMC 210, obtained from the SATCOM 140 itself or is calculated by the PMC 210, based on data available to the PMC 210, using known methods. In addition, PMC 210 obtains data indicative of the estimated altitude of the UAV 110. For example, PMC 210 Is configured to obtain the data from sensors fitted on-board the UAV 110 such as barometric pressure sensors or a radar altimeter. PMC 210 is further configured to obtain data indicative of the current angle of the antenna e.g., from the antenna system 120. In FIG. 1, the angle is denoted by ⊖. The angle ⊖ is representative of a direction of the antenna towards the spatial position of SATCOM 140. Considering that the antenna tracks the SATCOM 140, the PMC 140 is capable of determining the angle of the antenna 220 towards the SATCOM, based on optimal receipt signal from the SATCOM 140, all as explained in details above e.g. with respect to the tracking process. Based on at least the data indicative of the spatial position of the SATCOM 140, the data indicative of the estimated altitude of the UAV 110 and the data indicative of the angle of the antenna 220, the PMC 210 is configured to determine the position of the UAV 110 without using GPS, all as will be explained in greater details with reference to FIG. 3

It is noted that the teachings of the presently disclosed subject matter are not bound by the position system 200 described with reference to FIGS. 1 and 2. Equivalent and/or modified functionality can be consolidated or divided in another manner and can be implemented in any appropriate combination of software with firmware and/or hardware and executed on a suitable device. Those skilled in the art will also readily appreciate that the memory in PMC 210 can be consolidated or divided in other manner. Databases such as the memory in PMC 210 can be shared with other systems or be provided by other systems, including third party equipment.

For purpose of illustration only, the following description is provided for UAV 110. Those skilled in the art will readily appreciate that the teachings of the presently disclosed subject matter are, likewise, applicable to other mobile carriers using SOTM with an antenna system 120, as illustrated throughout the description.

Figure 3:
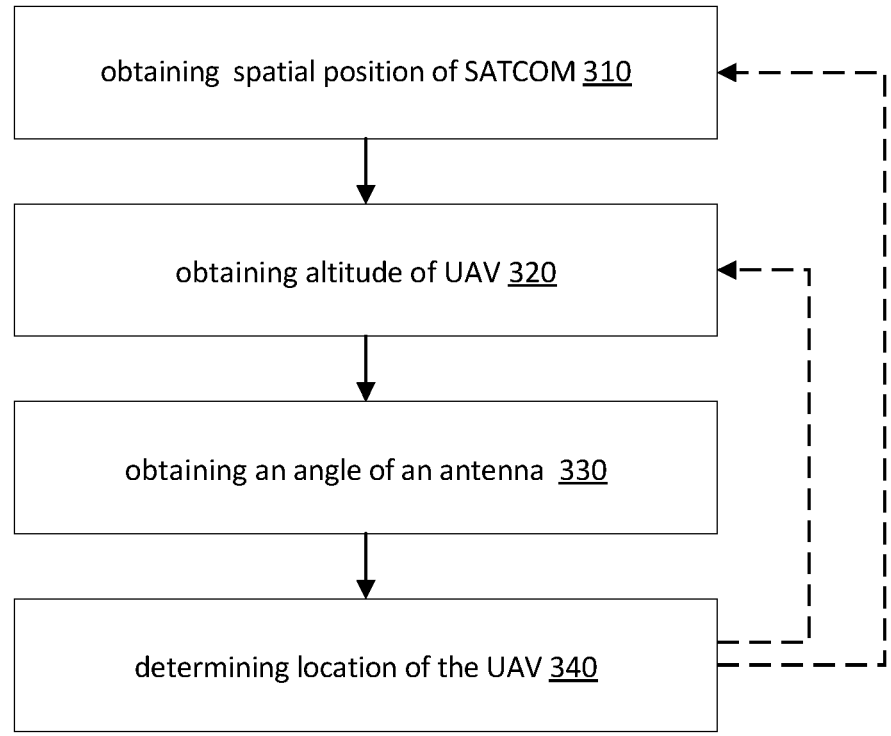
FIG. 3 illustrates a generalized flowchart of operations performed by PMC in the UAV, in accordance with certain embodiments of the presently disclosed subject matter.

Referring to FIG. 3, there is illustrated a generalized flowchart of operations performed by the PMC 210 comprised in the UAV 110, in accordance with certain embodiments of the presently disclosed subject matter. Note that the description below refers occasionally also to elements drawn in FIGS. 1 and 2.

As may be recalled, the UAV 110 comprising a positioning system 200. The positioning system 200 comprising a PMC 210 and a SOTM antenna system 120 that includes antenna 220. The antenna 220 being configured to maintain a communications link from a SATCOM 140. The SATCOM 140 having a spatial position.

In some cases, in order to determine the position of the UAV 110, the PMC 210 obtains data indicative of the spatial position of the SATCOM 140 (block 310). In some examples, the SATCOM 140 is stationary, and its spatial position is stored in a memory comprised in PMC 210. PMC 210 can obtain data indicative of the spatial position of the SATCOM 140 by retrieving the spatial coordinates from the memory. In some examples, PMC 210 communicates with SATCOM 140 and retrieves from the SATCOM 140 itself the spatial position of the SATCOM 140. In some other examples, the SATCOM 140 spatial position can be calculated by the PMC 210, based on data available to the PMC 210, using known methods. For example, when SATCOM 140 is not stationary and the trajectory of SATCOM 140 is known, the spatial position of SATCOM 140 can be calculated using actual time which denotes the spatial position of SATCOM 140 within its trajectory (using known per se techniques).

PMC 210 further obtains data indicative of an estimated altitude of the UAV 110 (block 320). For example, PMC 210 can obtain the UAV 110 current altitude by obtaining data from sensors fitted on-board the UAV 110 such as barometric pressure sensors or a radar altimeter.

As detailed above, in SOTM technology, the SOTM antenna system 120 tracks the spatial position of the SATCOM 140 by directing the antenna 220 towards the SATCOM 140, to maintain a communications link. Using known methods, PMC 210 determines, in each time interval, the angle of the antenna 220 in which the signal's current receipt is optimal and the antenna's angle is set to be in that angle (denoted in FIG. 1 as $\ominus$). In some other known systems, other technology may be used to track the spatial position of the SATCOM's 140 and setting and determining the angle of the antenna 220 in which the signal's current receipt is optimal.

In some cases, PMC 210 obtains data indicative of the angle $\ominus$ of the antenna 220, wherein the angle $\ominus$ is representative of a direction of the antenna 220 towards the spatial position of SATCOM 140 relative to the horizontal plane of the earth(block 330). In some examples, the current angle $\ominus$ is stored in the memory included in PMC 210 and PMC 210 retrieves the azimuth and elevation of angle $\ominus$ from the memory. In some other examples, PMC 210 calculates the azimuth and elevation of angle $\ominus$, relative to the horizontal plane of the earth. For example, PMC 210 retrieves 2 angles: the azimuth and elevation of the antenna relative to UAV 110, e.g. from the memory. In addition, PMC 210 obtains, e.g. using Inertial Navigation System fitted on-board the UAV 110, 3 additional angles: the azimuth, elevation and roll of UAV 110 relative to earth. Based on these 5 angles, PMC 210 can calculate, using known per se techniques, the azimuth and elevation of angle $\ominus$ relative to the horizontal plane of the earth, representative of a direction of the antenna towards the spatial position of SATCOM 140.

In some cases, once PMC 210 obtains data on the spatial position of the SATCOM 140, the estimated altitude of the UAV 110 and the angle $\ominus$, PMC 210 determines the position of the UAV 110 (block 340). As illustrated in FIG. 1, UAV 110, the spatial position of SATCOM 140 (X, Y, Z) and angle $\ominus$ create a virtual triangle. The distance of the UAV 110 from SATCOM, or the position of the UAV 110 on the line denoted in FIG. 1 by 'a' from SATCOM 140 through UAV 110, can be determined by PMC 210 based on the altitude of UAV 110 as obtained by PMC 210. Considering the obtained data, using known methods, such as geometric calculations, PMC 210 determines the position of the UAV 110.

For a UAV 110, which is always on the move, obtaining constant data of the position of the UAV 110 may be advantageous. In some examples, in order to determine a current position of the UAV 110 during its move, the PMC 210 repeatedly obtains updated data on the UAV 110 and determines, based on the updated data, the current position of the UAV 110. If the spatial position of SATCOM 140 is stationary and known, the PMC 210 does not have to obtain updated data with respect to the spatial position of SATCOM 140. Hence, in some examples, PMC 210 repeatedly obtains data indicative of an estimated altitude of the UAV 110 in the current position of the UAV 110, and data indicative of the current angle $\ominus$ of the antenna 220. The current angle $\ominus$ is representative of a direction of the antenna towards the SATCOM 140 spatial position, when the UAV 110 in its current position. Based on the updated data, and the known spatial position of the SATCOM 140, PMC 210 determines the current position of the UAV 110, all by avoiding the use of the GPS.

In examples where the position of the SATCOM 140 is not stationary, but can be calculated by the UAV 110, as described above with respect to block 310, the UAV 110 further obtains data indicative of the current spatial position of the SATCOM 140, in order to determine the current position of the UAV 110. Hence, in these examples, PMC 210 repeatedly obtains data indicative of the spatial position of the SATCOM 140, the estimated altitude of the UAV 110 and the angle $\ominus$ of antenna 220 and then determines, based on the obtained data, the current position of the UAV 110.

In some examples, the UAV 110 further comprises GPS 130, including a GPS receiver configured for receiving a GPS signal from a GPS satellite. However, sometimes, the GPS signal is disrupted. For example, there is no reception at all of the signal, the signal may be spoofed or jammed and does not enable to determine the position of the UAV 110 based upon the GPS signal. It is advantageous to determine the position of the UAV 110 constantly, including in times where the GPS signal is disrupted. Hence, in some cases, the PMC 210 determines the position of the UAV 110, based on the specified obtained data when a GPS signal is disrupted Moreover, in some cases, determining the position of the UAV 110, based on the obtained data indicative of the spatial position of the SATCOM, the obtained data indicative of the estimated altitude, and the obtained data indicative of the angle, without usage of GPS signal, may assist in recognizing that a GPS signal that is received at UAV 110 is disrupted. For example, the determined position in accordance with embodiments of the presently disclosed subject matter, as described throughout the description, can be compared to a position of UAV 110 as determined based on a GPS signal using known per se techniques. A discrepancy between the two positions may be indicative of a disrupted GPS signal received at UAV 110.

It is noted that the teachings of the presently disclosed subject matter are not bound by the flow chart illustrated in FIG. 3 the illustrated operations can occur out of the illustrated order. For example, operations 310, 320 and 330 shown in succession can be executed substantially concurrently, or in the reverse order. It is also noted that whilst the flow chart is described with reference to elements of UAV 110, such as PMC 210, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways, for example: determining the UAV 110 position using a radiation emitting object. As illustrated above, SATCOM is one example of such a radiation emitting object. However, SATCOM 140 should note be considered as limiting, and any radiation emitting object can be used to implement the invention, if a signal from that object can be received at the UAV 110, and if the spatial position of the radiation emitting object is known to or can be obtained or calculated by the UAV 110. The radiation emitting object can be stationary or mobile. Some examples of mobile radiation emitting objects are SATCOM 140 illustrated above and a maritime vessel. One example of a stationary radiation emitting object is ground station 150.

Figure 4:
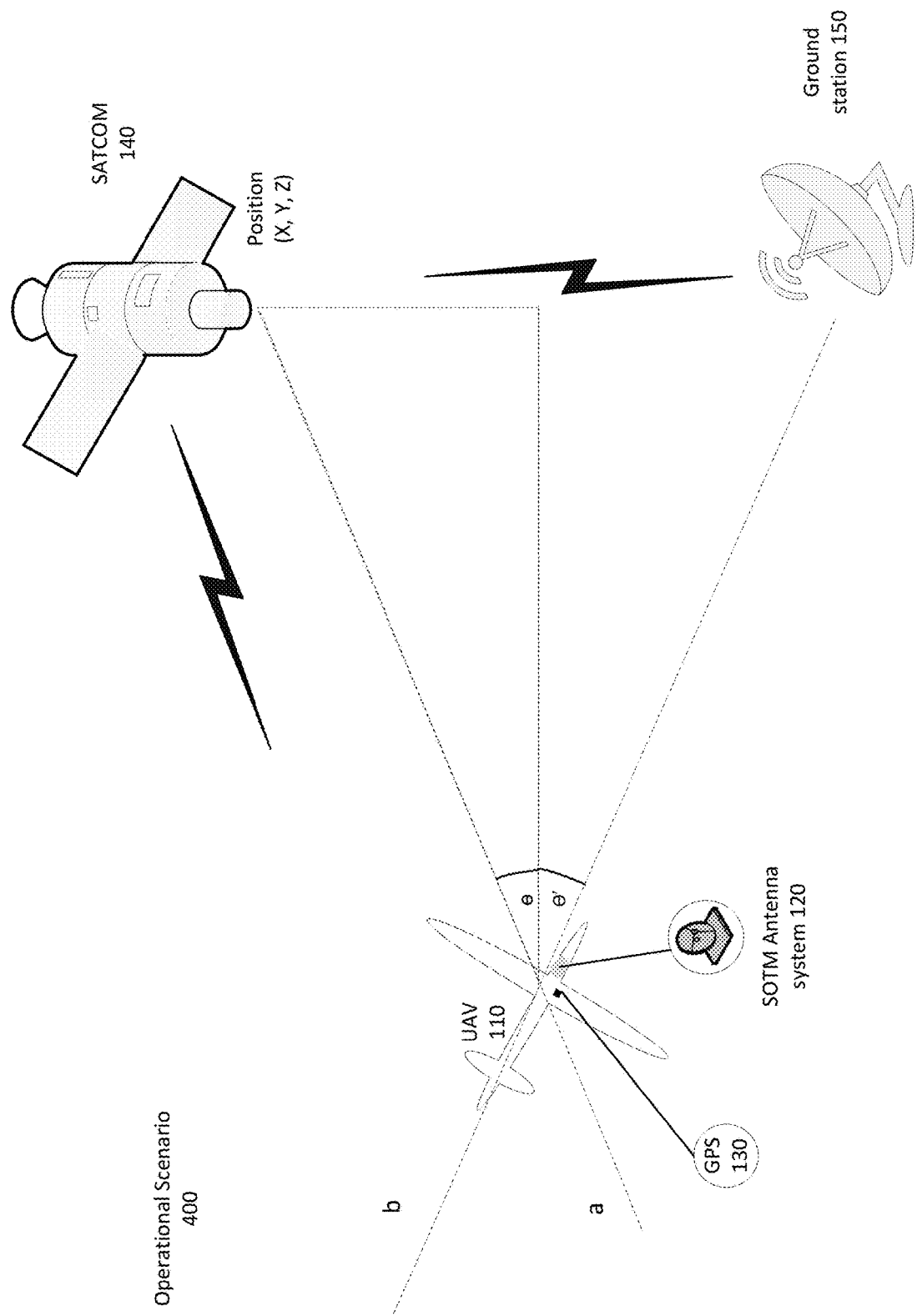
FIG. 4 shows a high-level illustration of an alternative operational scenario in which the position system is utilized in accordance with certain embodiments of the presently disclosed subject matter.

Bearing this in mind, reference is being made to FIG. 4 which shows a high-level illustration of an alternative operational scenario 400 in which the position system is utilized in accordance with certain embodiments of the presently disclosed subject matter.

FIG. 4 includes all elements depicted in FIG. 1, and further includes a line denoted by 'b' from ground station 150 through UAV 110, and a respective angle $\Theta'$. Line 'b' represents communication of UAV 110 with ground station 150, e.g. using a Line Of Sight directional antenna on-board the UAV 110, which communicates with a ground communication antenna on ground station 150. The spatial position of ground station 150 is known to UAV 110, or can be obtained by UAV 110.

In such cases, with reference also to FIG. 3, the PMC 210 obtains data indicative of the spatial position of ground station 150, in a similar manner to that described above with reference to block 310 in FIG. 3 of obtaining the spatial position of the SATCOM 140, mutatis mutandis. PMC 210 further obtains data indicative of an estimated altitude of the UAV 110 in a similar manner to that described above with reference to block 320 in FIG. 3. PMC 210 further obtains data indicative of the angle $\Theta'$ of the antenna, wherein the angle $\Theta'$ is representative of a direction of the antenna 220 towards the spatial position of ground station 150. For example, PMC 210 obtains the data indicative of the angle $\Theta'$, in a similar manner to that described above with respect to block 330 in FIG. 3, mutatis mutandis.

In some cases, once PMC 210 obtains data on the spatial position of ground station 150, the estimated altitude of the UAV 110 and the angle $\Theta'$, PMC 210 determines the position of the UAV 110, in a similar manner to that described above with respect to block 340.

A person versed in the art would realize that other radiation emitting objects can be used instead of SATCOM 140 or ground station 150.

Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. In a mobile carrier, the mobile carrier comprising a processing and memory circuitry (PMC) and a satellite communications on the move (SOTM) antenna system that includes an antenna and being configured to maintain a communications link from a satellite communications (SATCOM) having a spatial position, a method for determining a position of the mobile carrier, the method comprising, by the PMC:
 (a) obtaining data indicative of the spatial position of the SATCOM;
 (b) obtaining data indicative of an estimated altitude of the mobile carrier;
 (c) obtaining data indicative of an angle of the antenna, wherein the angle is representative of a direction of the antenna towards the SATCOM spatial position; and
 (d) determining the position of the mobile carrier, based on the obtained data indicative of the spatial position of the SATCOM, the obtained data indicative of the estimated altitude, and the obtained data indicative of the angle.

2. The method of claim 1, wherein the mobile carrier is an unmanned aerial vehicle (UAV).

3. The method of claim 1, wherein the angle is determined based on a current optimal receipt of a signal emitted from the SATCOM.

4. The method of claim 1, wherein obtaining data indicative of the angle of the antenna includes obtaining the azimuth and elevation of the angle, relative to the horizontal plane of earth.

5. The method of claim 1, the method further comprising: repeatedly performing steps (a) to (d).

6. The method of claim 1, the method further comprising: repeatedly performing steps (b) to (d).

7. The method of claim 1, wherein the data indicative of the estimated altitude is obtained using at least one of the following: barometric pressure sensors and radar altimeter, fitted on-board the mobile carrier.

8. The method of claim 1, wherein the mobile carrier further comprises a GPS receiver configured for receiving a GPS signal from a GPS satellite, and wherein stage (d) is executed in cases where a GPS signal is disrupted.

9. A system implemented in a mobile carrier for determining a position of the mobile carrier, the system comprising:
   a processing and memory circuitry (PMC);
   a satellite communications on the move (SOTM) antenna system that includes an antenna and being configured to maintain a communications link from a satellite communications (SATCOM) having a spatial position;
   the PMC is configured to:
   (a) obtain data indicative of the spatial position of the SATCOM;
   (b) obtain data indicative of an estimated altitude of the mobile carrier;
   (c) obtain data indicative of an angle of the antenna, wherein the angle is representative of a direction of the antenna towards the SATCOM spatial position; and
   (d) determine the position of the mobile carrier, based on the obtained data indicative of the spatial position of the SATCOM, the obtained data indicative of the estimated altitude, and the obtained data indicative of the angle.

10. A mobile carrier comprising the system of claim 9.

11. The mobile carrier of claim 10, wherein the mobile carrier further comprises a GPS receiver configured for receiving a GPS signal from a GPS satellite, and wherein stage (d) is executed in cases where the GPS signal is disrupted.

12. The system of claim 9, wherein the mobile carrier is an unmanned aerial vehicle (UAV).

13. The mobile carrier of claim 10, wherein the mobile carrier is an unmanned aerial vehicle (UAV).

14. In a mobile carrier, the mobile carrier comprising a processing and memory circuitry (PMC) and a satellite communications on the move (SOTM) antenna system that includes an antenna and being configured to maintain a communications link from a satellite communications (SATCOM) having a spatial position, a non-transitory computer readable storage medium tangibly embodying a program of instructions that, when executed by a computer, cause the computer to perform a method for determining a position of the mobile carrier, the method comprising:
   (a) obtaining data indicative of the spatial position of the SATCOM;
   (b) obtaining data indicative of an estimated altitude of the mobile carrier;
   (c) obtaining data indicative of an angle of the antenna, wherein the angle is representative of a direction of the antenna towards the SATCOM spatial position; and
   (d) determining the position of the mobile carrier, based on the obtained data indicative of the spatial position of the SATCOM, the obtained data indicative of the estimated altitude, and the obtained data indicative of the angle.

15. The non-transitory computer readable storage medium of claim 14, wherein the mobile carrier is an unmanned aerial vehicle (UAV).

16. The method of claim 1, wherein the mobile carrier further comprises a GPS receiver configured for receiving a GPS signal from a GPS satellite, the method further comprising:
   comparing the determined position of the mobile carrier to a position of mobile carrier determined based on an obtained GPS signal received by the GPS receiver to identify a discrepancy; and
   in response to identifying a discrepancy, recognizing that the GPS signal is disrupted.

17. The mobile carrier of claim 10, further comprising a GPS receiver configured for receiving a GPS signal from a GPS satellite, and the PMC is further configured to:
   (e) compare the determined position of the mobile carrier to a position of mobile carrier determined based on an obtained GPS signal received by the GPS receiver to identify a discrepancy; and
   (f) in response to identifying a discrepancy, recognize that the GPS signal is disrupted.

18. The non-transitory computer readable storage medium of claim 14, wherein the mobile carrier further comprising a GPS receiver configured for receiving a GPS signal from a GPS satellite, and wherein the method further comprising:
   comparing the determined position of the mobile carrier to a position of mobile carrier determined based on an obtained GPS signal received by the GPS receiver to identify a discrepancy; and
   in response to identifying a discrepancy, recognizing that the GPS signal is disrupted.

* * * * *